3,110,555
SEPARATION OF PROTACTINIUM FROM MOLTEN SALT REACTOR FUEL COMPOSITIONS
James H. Shaffer, Oak Ridge, James E. Strain and David R. Cuneo, Kingston, and Minton J. Kelly, Oak Ridge, Tenn., assignors to the United States of America as represented by the United States Atomic Energy Commission
No Drawing. Filed Aug. 22, 1960, Ser. No. 51,242
6 Claims. (Cl. 23—14.5)

The present invention relates generally to the separation of trace amounts of protactinium from relatively large quantities of uranium and/or thorium and particularly to a method of recovering and separating protactinium from a molten salt reactor fuel containing soluble thorium and/or uranium values.

The production of useful power from a nuclear reactor system at an economically competitive price depends to a large extent on the cost of fissionable material. Reduction in fuel costs can be accomplished by conversion of fertile material into fissionable material by absorption of the excess neutrons of a neutron chain fission reaction. One method for obtaining low-cost fissionable uranium is through the use of the thorium-232-uranium-233 breeding cycle, in which fissioned uranium-235 is replaced by uranium-233 produced by neutron capture in thorium-232 in accordance with the following chain of nuclear reactions:

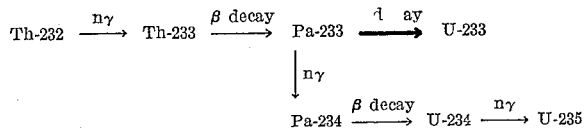

To make full use of the uranium-233 thus produced, the conversion efficiency of the breeding cycle must be equal to or greater than 100 percent. That is to say, more fissionable material (uranium-233) must be produced than is consumed in maintaining the fission of uranium-235 or uranium-233. This means, in turn, that if thorium-232 is to be useful as a source of power, the conditions of operating a breeder reactor must be such that the conversion ratio C (number of new fissionable atoms produced for each fissionable atom of uranium-235 or uranium-233 consumed) must be at least equal to 1, where the value of C is determined from the following equation:

$$C = \eta - 1 - L$$

where:

$\eta$ refers to the number of neutrons produced by the fissioning of uranium-235, and L is the number of neutrons lost by parasitic capture (i.e., non-fission capture).

If C is unity, then the inventory of fissionable material will remain constant; if C is greater than unity, then the inventory of fissionable material will increase.

It has been found that certain molten salt reactor fuel compositions can maintain usefully high amounts of thorium and uranium in solution. As a result, it has been proposed to construct a molten salt breeder reactor in which the advantages of a molten salt reactor fuel system could be combined with the advantages associated with a breeding cycle. For information concerning the design, construction and operation of a molten salt neutronic reactor, reference is made to "Fluid Fuel Reactors," Addison-Wesley Publishing Co., Inc., 1959, part II, pages 567–697.

A fluid fuel reactor has both advantages and disadvantages when compared to other types of reactors. The principal advantages over solid fuel element reactor systems are: a high negative temperature coefficient of reactivity, minimal radiation damage that can reduce fuel burnup, the possibility of continuous addition of new fuel and reprocessing of spent fuel to remove fission products and avoidance of heavy costs associated with fabricating solid fuel elements. To gain the benefit of these advantages, a circulating molten salt reactor fuel system must satisfy certain basic requirements, among which are: relatively low melting point, low corrosive action, high radiation stability at elevated temperatures, satisfactory uranium and thorium solubility of resultant solution to permit circulation of the molten salt fuel system and at the same time allow a sustained neutron chain fission reaction to occur within a reasonably small volume, satisfactory thorium solubility to permit breeding at a conversion ratio at least equal to one, and a combination of high heat capacity, high thermal conductivity, and low vapor pressure and viscosity at elevated temperatures to permit the use of the circulating fuel system as an efficient heat transfer agent at substantially atmospheric pressure.

If the molten salt nuclear reactor fuel is to be used in a breeding cycle, it must have all of these properties and, above all, the number of neutrons lost by parasitic neutron absorption (the L factor in the above equation) must be low enough to permit efficient breeding. A number of useful molten salt reactor fuel systems have recently been developed. See, for example, Barton and Grimes, U.S. Patent 2,920,024, of common assignee, and pages 567–594 in the "Fluid Fuel Reactor," previously referenced. Molten salt reactor fuel compositions generally comprise one or more alkali and alkaline earth metal fluorides containing dissolved therein a fissionable metal fluoride such as a uranium fluoride and/or a fertile metal fluoride such as a thorium fluoride. Because only relatively small amounts of fissionable and fertile fluoride can be dissolved, the solvent salts of the fused fluoride composition largely determine the physical and nuclear properties of the total composition. Several examples of suitable fuel compositions which have the necessary combination of physical and nuclear properties mentioned above and to which this invention may be applied include the following:

67 mole percent Li$^7$F, 18 mole percent BeF$_2$, and 15 mole percent ThF$_4$ 65 mole percent Li$^7$F, 30.5 mole percent BeF$_2$, 0.5 mole percent UF$_4$, and 4 mole percent ThF$_4$ 67 mole percent Li$^7$F, 18.5 mole percent BeF$_2$, 0.5 mole percent UF$_4$, and 14 mole percent ThF$_4$ 65 mole percent Li$^7$F, 30 mole percent BeF$_2$, 1.0 mole percent UF$_4$, and 14 mole percent ThF$_4$.

The process of this invention may also be applied with advantage to other similar systems containing lithium fluoride and beryllium fluoride as the solvent salts and containing small amounts of uranium tetrafluoride and/or thorium tetrafluoride.

Referring to the nuclear reactions occurring in the thermal neutron irradiation of thorium, it will be noted that neutron capture by thorium-232 yields thorium-233 and then, by beta decay, the thorium-233 is converted to protactinium-233. In the absence of a neutron flux the protactinium-233 will decay to the desired fissionable product, uranium-233. However, in a neutron flux the protactinium-233 will, by a process involving capture of a second neutron, be converted to uranium-235. Effectively, then, for every atom of protactinium-233 in a neutron field a loss of two neutrons will result. It will be evident that this wastage of neutrons can negate the advantageous use of the thorium breeding cycle unless some means can be found to remove protactinium rapidly and continously from a neutron flux.

Apart from the wastage of neutrons, if the uranium-233 is being formed in the blanket region of a breeder reactor containing the fertile thorium-232 isotope, the fission of freshly formed uranium-233 may be undesirable because of the additional heat (generated by the fission of the uranium-233 and of any uranium-235) which must be removed from the reactor blanket and the additional processing required to decontaminate the uranium in the blanket from fission products. Moreover, even in a single region molten salt reactor where the fertile material and the fissionable material are found in a single fuel composition, the wastage of neutrons due to the neutron absorption reactions involving protactinium-233 will result in a deleteriously high loss of neutrons.

It is, therefore, an object of the present invention to provide a method for the rapid and continuous removal of protactinium from a neutron-irradiated solution of thorium in a fused salt reactor fuel composition. A general object of this invention is to separate protactinium from a fused salt composition containing protactinium and thorium and/or uranium. A specific object of this invention is to increase the neutron economy in a fused salt reactor system designed to operate in conjunction with a thorium-232-uranium-233 breeding cycle. A further object of this invention is to separate micro quantities of protactinium from relatively large quantities of thorium and/or uranium. Another object is to provide a quantitative and selective method of separating protactinium from a neutron-irradiated halide mixture containing thorium and/or uranium. A still further object of this invention is to provide a method of treating a fused halide reactor fuel containing thorium and/or uranium to selectively separate protactinium therefrom without essentially changing the relative amount of ingredients comprising said fuel.

With these and other objects in mind, the present invention, in its most useful aspect, consists of a method of separating protactinium from a neutron-irradiated fused fluoride reactor fuel composition comprising the steps of converting the said protactinium in said composition to an insoluble oxide product by contacting said composition with an inorganic metal oxide which is thermally stable at the temperature of said composition and which is thermodynamically less stable than the resulting protactinium oxide produced, and thereafter separating the resultant insoluble protactinium oxide product. By "thermodynamically less stable" is meant that, under the conditions of contact, the inorganic metal oxide precipitant will be fluorinated to form a soluble metal fluoride and the protactinium in solution will be selectively and quantatively converted to an insoluble protactinium oxide product. Among the inorganic metal oxide precipitants which are operable to selectively convert protactinium in molten fluoride compositions to a separable insoluble oxide product are alkali metal oxides such as lithium oxide, sodium oxide, rubidium oxide; alkaline metal earth oxides such as beryllia, and calcium oxide and refractory metal oxides such as zirconia, alumina, uranium oxides, and thorium oxide.

While a relatively large number of metal oxides are useful from the point of view of selectively precipitating protactinium values from a fused halide solution, there are several other considerations which limit the practical choice of available precipitant metal oxides to a relatively small class when the process of this invention is applied to a neutron-irradiated fused fluoride composition. A metal oxide which can cause selective precipitation of protactinium values cannot have an objectionably high neutron capture cross section, or it would defeat a major object of the invention which is to increase, or at least maintain, the neutron economy of the system to be treated. In another case, the added metal oxide may be satisfactory from a nuclear standpoint, but may be unsatisfactory because of its effect on the physical character of the system. For example, the addition of a selected metal oxide precipitant may effectively precipitate protactinium, but may also adversely affect the melting point, density, viscosity or heat transfer properties of the system.

It is, therefore, apparent that of the broad class of metal oxides which may be effective to selectively precipitate protactinium values only those metal oxides which have the least deleterious effect on the physical and nuclear characteristics of the protactinium-containing system can be used with maximum advantage. We have found that the oxides of the corresponding metal fluorides comprising the molten salt reactor fuel system to be treated can be used with maximum effect to selectively precipitate protactinium values and at the same time cause a least disruptive effect on the physical and nuclear properties of the treated system. Thus, for example, in treating a neutron-irradiated fused fluoride composition consisting of lithium fluoride, beryllium fluoride, and thorium fluoride to precipitate and separate protactinium therefrom, the most advantageous metal oxide precipitant to be used should be selected from the group lithium oxide, beryllium oxide, and thorium oxide. Similarly, in a neutron-irradiated fused salt mixture consisting of lithium fluoride, beryllium fluoride, thorium fluoride and uranium fluoride the most advantageous protactinium precipitant metal oxide should be selected from the group lithium oxide, beryllium oxide, thorium oxide, and uranium oxide.

The method of the present invention is extremely sensitive. We have found that fused fluoride compositions containing less than 10 parts protactinium per billion parts of total metal fluoride content may be treated to separate and recover substantially all of the total protactinium content.

In practicing this invention, a small amount of a selected metal oxide precipitant is contacted with a solution of protactinium in a fused fluoride composition. The protactinium will precipitate in a very short time thereafter and the metal oxide will be converted to its corresponding soluble fluoride. Since the efficiency of most of the metal oxide precipitants is relatively high, only a small amount will be necessary to effect quantitative protactinium separation and, as a result, the change in physical character of the resultant fused fluoride composition will be minimal. Furthermore, when the choice of the metal oxide precipitant is restricted to the oxides of the corresponding metal fluorides comprising the composition to be treated, the total parasitic neutron capture cross section of the system will be virtually unchanged.

After addition of the metal oxide precipitant to the fused fluoride solution the resultant mixture is then filtered to isolate the precipitated protactinium from the bulk of the solution. Another convenient way of practicing the invention is to pass the protactinium-containing fused salt composition through a porous column of the selected metal oxide precipitant. The metal oxide column will serve as a trap for the precipitated protactinium values and the effluent fluoride salt composition will be effectively decontaminated of its protactinium content.

Having described our invention in general terms, the following examples will illustrate various specific embodiments in further detail.

All experiments in the examples were conducted in a system consisting of a cylindrical nickel vessel suitably flanged and gasketed to insure a positive seal. The flange was penetrated by a capped filler pipe to permit introduction of salt into the vessel and taking of samples during an experimental run; a gas filler line attached to a gas manifold to allow introduction of hydrogen fluoride and other gases below the surface of the molten salt in the reaction vessel; a gas exit line, and a thermocouple well extending nearly to the bottom of the nickel vessel. The reaction vessel was surrounded by a tubular furnace to maintain the salt in a molten state as desired.

EXAMPLE I

About 500 grams of a fluoride salt mixture consisting essentially of 18 mol percent beryllium fluoride, 67 mol percent lithium fluoride and 15 mol percent thorium fluoride was introduced into the nickel reaction vessel and heated to a temperature in the range 600 to 700° C. to form a molten mass. One gram of thorium dioxide, which had been irradiated in the Oak Ridge graphite reactor to yield a product having a specific activity of $5 \times 10^7$ counts of Pa-233/min./gram $ThO_2$ was introduced into the molten salt mixture. Hydrogen fluoride and hydrogen were then alternately bubbled through the salt at a temperature of about 650° C. until the protactinium-233 content of successive filtered samples of the salt was found to be constant, indicating complete conversion of the protactinium to protactinium fluoride. Samples were obtained with a thin copper tube provided with a sintered disk at one end. The tube was immersed in the salt through the filler pipe and samples were obtained by applying a vacuum to the open end of the tube. Each sample was ground to a homogeneous powder and measured for protactinium-233 activity.

Measurements were made by counting weighed triplicate samples of the powder on a 20 cannel Atomic Instrument spectrometer using a 3 x 3 in. NaI(Tl) scintillation crystal. The spectrometer was used as a discriminating counter and only the photons in the energy region 0.28 mev.–.34 mev. were recorded. Using a standard geometry, corrections were made for varying sample weight, background, natural radioactivity of thorium, and decay of Pa-233 ($t\frac{1}{2}=27.4$ days). The corrected count was converted to specific activity in counts Pa-233/min./gram of the fused salt. The percentage of Pa-233 remaining in solution was calculated by a comparison of the specific activity of the sample to the specific activity of the melt prior to the addition of the precipitant metal oxide.

After all protactinium had been fluorinated, beryllium oxide was added, in incremental amounts, to the fused salt mixture. After each addition of beryllium oxide, a filtered sample of the salt was obtained as above and measured for protactinium-233 content, and uranium content where the fused salt compositions contained uranium. The results of the above and five other typical runs conducted according to the described procedure are summarized in Table I below.

Table I

| Run No. | Oxide Addition | | | P.p.m. U | Pa-233 Content | |
|---|---|---|---|---|---|---|
| | Oxide [a] | Grams/ Addition | Total Added | | Counts/ min./gram $\times 10^{-4}$ | Percent Pa-233 Remaining in Sol.[b] |
| 1 | BeO | ---- | ---- | ---- | 5.62 | 100. |
| | BeO | 1.00 | 1.00 | ---- | 2.65 | 47.2 |
| | BeO | 1.13 | 2.13 | ---- | 0.41 | 7.3 |
| | BeO | 1.18 | 3.31 | ---- | 0.014 | 0.24 |
| 2 | BeO [c] | ---- | ---- | 1,335 | 2.96 | 100. |
| | BeO [c] | 1.03 | 1.03 | 1,056 | 0.26 | 8.8 |
| | BeO [c] | 1.25 | 2.28 | 422 | 0.013 | 0.44 |
| | BeO [c] | 1.00 | 3.28 | 133 | 0.004 | <0.2 |
| 3 | BeO | ---- | ---- | 1,642 | 2.44 | 100. |
| | BeO | 1.07 | 1.07 | 1,322 | 0.21 | 9. |
| | BeO | 1.03 | 2.10 | 604 | 0.0055 | 0.23 |
| | BeO | 0.99 | 3.09 | 246 | 0.0055 | 0.23 |
| 4 | BeO | ---- | ---- | ---- | 15.0 | 100. |
| | BeO | 0.99 | 0.99 | ---- | 0.74 | 4.9 |
| | BeO | 1.27 | 2.26 | ---- | 0.022 | 0.15 |
| | BeO | 0.99 | 3.25 | ---- | 0.007 | 0.05 |
| | BeO | 0.99 | 4.24 | ---- | ~0.007 | <0.05 |
| 5 | CaO | ---- | ---- | ---- | 7.5 | 100. |
| | CaO | 1.02 | 1.02 | ---- | 2.5 | 33. |
| | CaO | 2.00 | 3.02 | ---- | 0.006 | <0.08 |
| | CaO | 1.00 | 4.02 | ---- | 0.006 | <0.08 |
| 6 | CaO | ---- | ---- | ---- | 10.0 | 100. |
| | CaO | 0.98 | 0.98 | ---- | 3.0 | 30. |
| | CaO | 1.02 | 2.00 | ---- | 0.056 | 0.56 |
| | CaO | 1.02 | 3.02 | ---- | 0.0027 | 0.03 |

[a] BeO: <325 mesh; CaO: Analytical reagent grade-unsized.
[b] Pa-233 content assigned the value of 100% at beginning of each series of oxie additions.
[c] Between Runs No. 1 and 2, 800 p.p.m. U added as $UF_4$.

EXAMPLE II

In this example, protactinium-231, an alpha emitter, was used to increase the protactinium content to a concentration in the range 50–75 parts of protactinium per million parts of salt.

A protactinium-231 sulfate solution was evaporated to dryness in a platinum crucible. Ammonium bifluoride was melted in the crucible containing the dried sulfate salt and allowed to cool. The resultant bifluoride cake was transferred to a nickel reaction vessel of a system similar to the one described in Example I, said vessel containing about 400 gms. of a salt mixture consisting of lithium fluoride-beryllium fluoride-thorium fluoride (67–18–15 mol percent, respectively) spiked with protactinium-233 tracer. The resultant mixture was heated slowly to about 300° C. and held at temperature until the bifluoride had completely decomposed, leaving the protactinium-231 deposited on the solid fluoride mixture. The temperature was then raised to about 650° C. and the molten mixture treated alternately, first with hydrogen fluoride and then with hydrogen to effect fluorination of the protactinium and consequent dissolution of the resultant protactinium fluoride. To the resultant fused fluoride mixture was then added 3.02 gms. of beryllium oxide, in incremental amounts. After each addition of beryllium oxide, a filtered sample of the molten salt was taken and measured for gamma and aplha activity. The filtered salt samples were prepared for α counting by dissolution in $H_2SO_4$, then adding HCl and $H_2O_2$ and finally extracting with diisobutyl carbinol. An aliquot of the extracted liquid was evaporated to dryness on stainless steel plates for alpha counting with a $2\pi$ gas flow alpha proportional counter. Another aliquot treated in the same way was checked for Pa-233 content with the 20 channel gamma spectrometer described in Example I. The gamma-to-alpha ratio was found to remain essentially constant for all samples thus indicating that the Pa-231 and Pa-233 reacted in the same manner.

In two parallel experiments the same procedure was repeated as above except that in one experiment the metal oxide precipitant used was thorium oxide, and in another the precipitant was uranium dioxide containing about 25 percent $U_3O_8$. The results are summarized in Table II below.

Table II

| Oxide Addition | | | Pa-233 Activity a | Percent Pa-233 Remaining in Solution | Activity of Extracted Samples | | |
|---|---|---|---|---|---|---|---|
| Oxide | Grams/ Addition | Total Added | Counts/ min./gram ×10⁻⁴ | | Gamma Counts b/ 2 min./500λ | Alpha Counts/ 2 min./500λ | $\frac{\gamma}{\alpha}$ |
| | | | 22.0 | c 100 | 38,800 | 7,200 | 5.4 |
| BeO | 0.99 | 0.99 | 7.8 | 35.5 | 20,600 | 3,900 | 5.3 |
| BeO | 0.97 | 1.96 | (d) | (0) | 60 | 10 | 6. |
| BeO | 1.06 | 3.02 | (d) | (0) | | | |
| | | | 19.2 | c 100 | 36,400 | 7,500 | 4.9 |
| $ThO_2$ | 1.07 | 1.07 | 10.0 | 50.5 | 5,800 | 1,100 | 5.3 |
| $ThO_2$ | 1.11 | 2.18 | 4.1 | 20.7 | 11,200 | 2,200 | 5.1 |
| $ThO_2$ | 3.12 | 5.30 | 0.04 | 0.2 | 108 | 16 | 6.7 |
| $ThO_2$ | 3.07 | 8.37 | 0.02 | 0.1 | | | |
| | | | 22.0 | c 100 | 47,200 | 10,000 | 4.7 |
| | | | 21.5 | c 100 | 8,000 | c 1 | |
| $UO_2$ f | | | 20.5 | c 100 | | | |
| $UO_2$ f | 0.99 | 0.99 | 18.5 | 90.2 | | | |
| $UO_2$ f | 1.02 | 2.01 | 13.0 | 63.4 | | | |
| $UO_2$ f | 1.07 | 3.08 | 7.1 | 34.6 | | | |
| $UO_2$ f | 0.98 | 4.06 | 4.0 | 19.5 | | | |
| $UO_2$ f | 1.08 | 5.14 | 3.1 | 15.1 | | | |
| $UO_2$ f | 1.06 | 6.20 | 2.6 | 12.7 | | | |
| $UO_2$ f | 4.44 | 10.64 | 0.9 | 4.4 | | | |
| $UO_2$ f | 5.54 | 16.28 | 0.03 | 1.5 | | | | a By gamma spectrometry of filtered powdered samples.
b Liquid extract counted in gamma spectrometer; 500λ pipetted on stainless steel plates for alpha count.
c Pa-233 content assigned the value 100% at beginning of each series of oxide additions.
d Background.
e Before Pa-233 addition to salt mixture.
f $UO_2$ contained about 25% by weight $U_3O_8$ (about 100 mesh particles).

It will be apparent from the foregoing examples that in accordance with the present invention, micro quantities of protactinium were selectively and quantitatively separated and recovered from a fused salt composition.

Several advantages accrue from this invention as applied to molten salt reactor breeder systems. Since the solvent carrier salts and the thorium values dissolved therein are virtually unaffected by the protactinium removal, this process enables a considerable savings in thorium and blanket carrier salt costs and a reduction in the extent of chemical processing required to remove fission products from the blanket. Each atom of protactinium that is prevented from destruction by neutron absorption provides an additional atom of U-233 available for fission. Furthermore, each atom of protactinium that is removed from the neutron flux of a reactor leaves two neutrons available for fission which would otherwise be lost by parasitic capture in the protactinium. The sum of these advantages can be regarded as either a reduction in fuel-cycle costs for a reactor with a given breeding performance, or as an improvement in the breeding performance of a reactor with a given fuel-cycle cost.

While the process of this invention has been described in connection with its use in treating neutron-irradiated compositions, it may also be applied with advantage to isolate a pure protactinium product from uranium-containing natural sources. Thus, for example, protactinium values may be isolated from uranium ores by dissolving, in a fused fluoride salt composition, either the acid insoluble residue which remains when pitchblende is treated with nitric and sulfuric acids (the so-called Rueckrueck Stande), or the carbonate precipitate resulting from treatment of the acid extract of pitchblende with a solution of sodium carbonate, and then contacting the resultant protactinium solution with the metal oxide precipitants defined herein to precipitate and thereafter isolate a purified protactinium oxide product.

Since many embodiments may be made of the process herein described, and since many variations will occur to those skilled in the art, it is to be clearly understood that the invention is not limited to the particulars described herein, and that the scope of the invention is to be defined by the following claims.

What is claimed is:
1. A method of separating protactinium from a neutron-irradiated fused fluoride salt composition consisting essentially of at least one metal selected from the group consisting of alkali and alkaline earth metal fluorides and a soluble fluoride of a metal selected from the group uranium and thorium, the method which comprises contacting said composition with an oxide selected from the group consisting of an alkali metal oxide, an alkaline earth oxide, thorium oxide, and uranium oxide, and thereafter isolating the resultant insoluble protactinium oxide product from said composition.

2. The method according to claim 1 wherein the metal oxide is lithium oxide.

3. The method according to claim 1 wherein the metal oxine is beryllium oxide.

4. The method according to claim 1 wherein the metal oxide is a thorium oxide.

5. The method according to claim 1 wherein the metal oxide is a uranium oxide.

6. In a method for selectively precipitating protactinium from a neutron-irradiated fused fluoride salt composition comprising at least one metal fluoride selected from the group consisting of an alkali metal fluoride, and an alkaline earth metal fluoride containing dissolved thorium-232 values, the step which comprises adding to said composition an inorganic metal oxide corresponding to any of the metal fluorides of said composition.

References Cited in the file of this patent
UNITED STATES PATENTS

| | | |
|---|---|---|
| 2,831,750 | Seaborg | Apr. 22, 1958 |
| 2,843,452 | Moore | July 15, 1958 |
| 2,869,983 | Gruen | Jan. 20, 1959 |
| 2,887,357 | Seaborg | May 19, 1959 |
| 2,915,363 | Gross | Dec. 1, 1959 |
| 2,948,586 | Moore | Aug. 9, 1960 |

OTHER REFERENCES

Nuclear Science Abstracts, vol. 13, No. 23, December 15, 1959, Abstract No. 13: 21004.

Bruce et al.: "Process Chemistry," vol. 3, Progress in Nuclear Energy, McGraw-Hill, received by POSL April 1, 1959, pp. 218, 219.